United States Patent [19]

Whitmore

[11] Patent Number: 5,600,517
[45] Date of Patent: Feb. 4, 1997

[54] MAGNET/BLOCK ASSEMBLY FOR DISC DRIVE SYSTEMS

[75] Inventor: Robert W. Whitmore, Longmount, Colo.

[73] Assignee: Seagate Technology, Inc., Scotts Valley, Calif.

[21] Appl. No.: 312,433

[22] Filed: Sep. 26, 1994

Related U.S. Application Data

[63] Continuation of Ser. No. 99,808, Jul. 29, 1993, abandoned, which is a continuation of Ser. No. 728,155, Jul. 10, 1991.

[51] Int. Cl.⁶ .............................. G11B 5/55; G11B 5/012
[52] U.S. Cl. ........................................ 360/106; 360/98.01
[58] Field of Search .................................. 360/106, 98.01, 360/97.01, 99.08, 98.07, 104, 105, 107, 109

[56] References Cited

U.S. PATENT DOCUMENTS

| | | | |
|---|---|---|---|
| 4,710,834 | 12/1987 | Brand et al. | 360/106 |
| 4,714,972 | 12/1987 | Biermeier et al. | 360/106 |
| 4,796,122 | 1/1989 | Levy et al. | 360/106 |
| 4,805,055 | 2/1989 | Wright | 360/106 |
| 4,890,174 | 12/1989 | Chalmners et al. | 360/78.12 |
| 4,941,062 | 7/1990 | Yoshioka | 360/106 |
| 5,016,131 | 5/1991 | Riggle et al. | 360/106 |
| 5,050,026 | 9/1991 | Goss | 360/106 |
| 5,119,253 | 6/1992 | Kotani | 360/106 |

*Primary Examiner*—Robert S. Tupper
*Assistant Examiner*—David D. Davis
*Attorney, Agent, or Firm*—Kinney & Lange

[57] ABSTRACT

A magnet/block assembly is provided for creating and distributing a magnetic field that interacts with a magnetic field produced by an actuator coil in a disc drive system. The magnet/block includes permanent magnets and a block comprised of a back iron separated from a front iron by a gap space. A loop is integrally formed with the back iron and the front iron at an end of the gap space to provide a path for flux to be conducted between the front iron and the back iron.

15 Claims, 5 Drawing Sheets

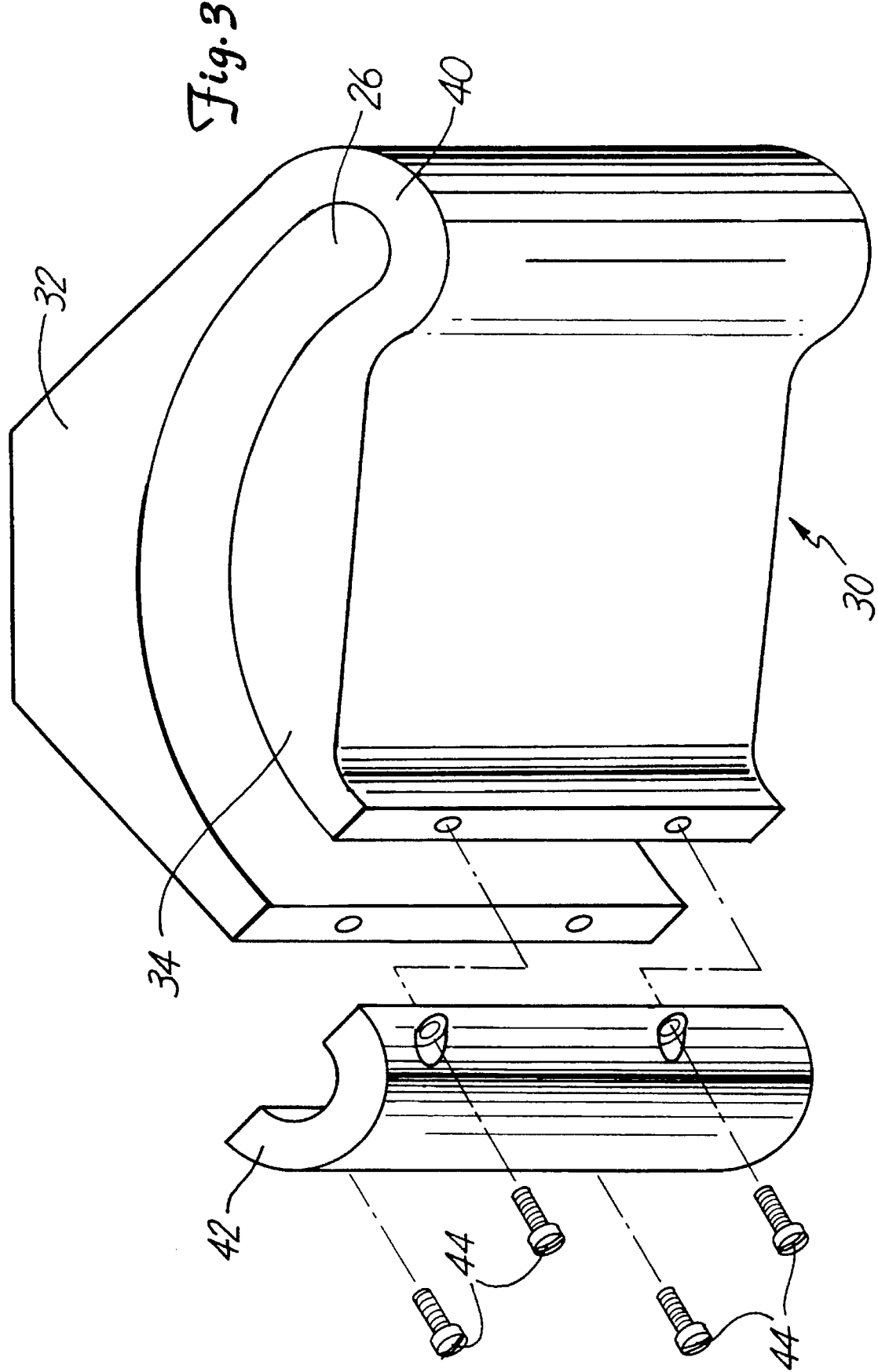

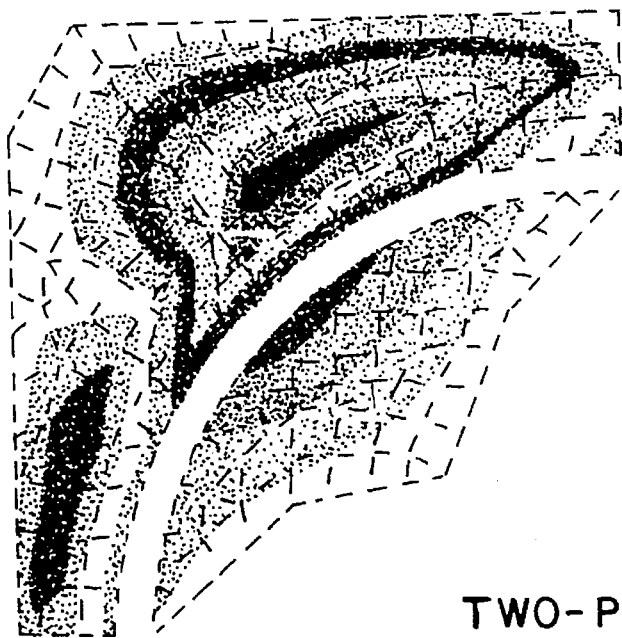
TWO-PIECE MAGNET/BLOCK
ASSEMBLY OF THE PRIOR ART
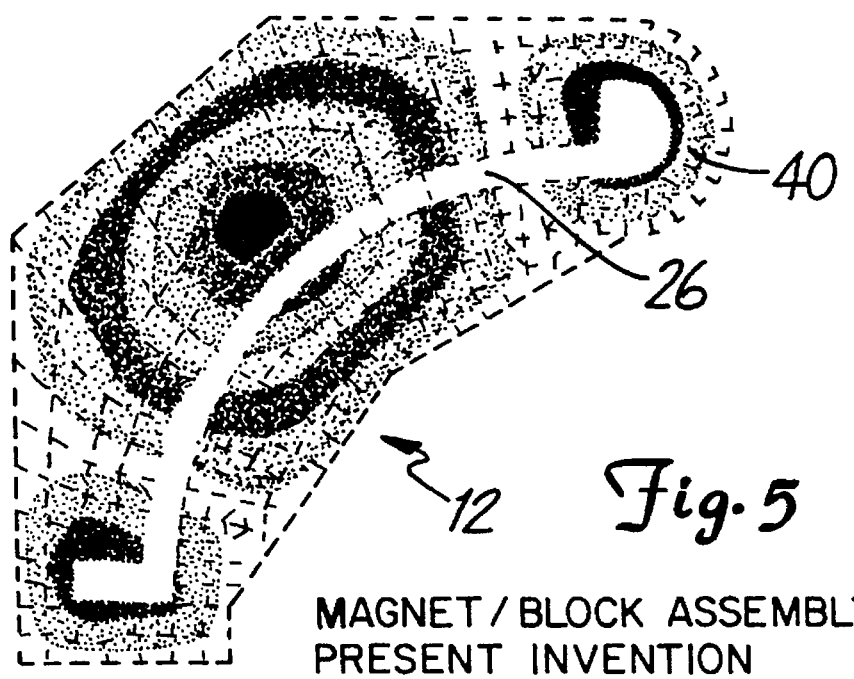
MAGNET/BLOCK ASSEMBLY OF THE
PRESENT INVENTION

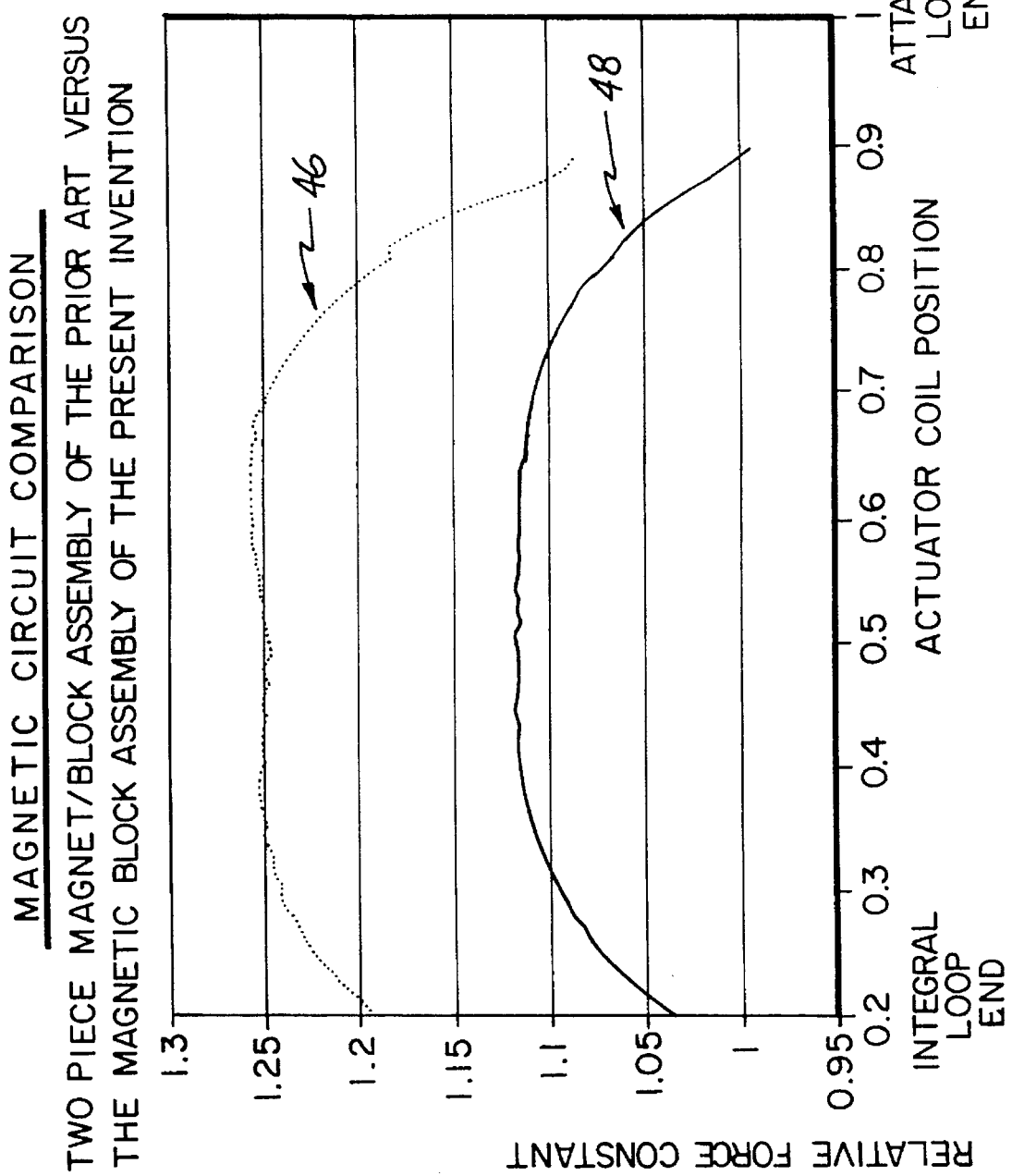

MAGNET/BLOCK ASSEMBLY FOR DISC DRIVE SYSTEMS

This is a continuation application Ser. No. 08/099,808, filed Jul. 29, 1993, now abandoned, which in turn is a continuation of application Ser. No. 07/728,155, filed Jul. 10, 1991.

BACKGROUND OF THE INVENTION

The present invention relates to track accessing arm movement in disc drive systems. More specifically, the present invention relates to a magnet/block assembly that creates and distributes a permanent magnetic field which interacts with a transient magnetic field produced by an actuator coil that is connected to a track accessing arm in a disc drive system.

In a disc drive system, transducer head assemblies write and retrieve data from concentric tracks of magnetic media discs. A transducer head assembly is typically connected to a resilient member, such as a gimbal spring, which in turn is connected to an end of a track accessing arm.

An actuator coil is connected to an end of the track accessing arm opposite the end that carries the transducer head assembly. The actuator coil is placed within a gap space of a magnet/block assembly. The magnet/block assembly includes permanent magnets, which create a permanent magnetic field, and a block, typically formed of materials having ferromagnetic properties. Between the two ends of the track accessing arm is an actuator spindle that forms an axis of rotation intermediate the actuator coil and the transducer head assembly.

Applying a current to the actuator coil positions and holds the transducer head assembly over various concentric tracks of the magnetic media disc. The current applied to the actuator coil produces a transient magnetic field that interacts with the permanent magnetic field in the gap space of the magnet/block assembly. The interaction between the two magnetic fields rotates the track accessing arm along the axis of rotation. The rotation of the track accessing arm moves the transducer head assembly between various concentric tracks of the magnetic media disc.

In one embodiment of the prior art, a magnet/block assembly comprises permanent magnets and a two piece block that includes a back iron separated from a front iron by a gap space. The permanent magnets produce a magnetic field that is distributed in the gap space. A magnet/block assembly of this type may have two or four magnets placed in the gap space. One example of this type of magnet/block assembly is disclosed in Levy et al. U.S. Pat. No. 4,796,122.

In another embodiment found in the prior art, a magnet/block assembly has three prongs that form two gap spaces between the prongs. An actuator coil having a hollow center surrounds the center prong with part of the coil in the first gap space and another part of the coil in the second gap space. The magnet/block assembly is formed with an open end and a closed end. A plate, or loop, is attached to the open end after the actuator coil is placed around the center prong. The plate, or loop, connects the three prongs and forms a flux conduction path. While this type of block can be formed integrally, the block has two gap spaces, and therefore requires more permanent magnets than does a block that has a single gap space. Examples of this type of magnet/block assembly are disclosed in Brand et al. U.S. Pat. No. 4,710,834, Wright U.S. Pat. No. 4,805,055, Chalmers et al. U.S. Pat. No. 4,890,174 and Yoshioka U.S. Pat. No. 4,941,062.

SUMMARY OF THE INVENTION

It has been found that an integrally formed magnet/block assembly having a single gap space minimizes the number of permanent magnets required and reduces manufacturing costs and tolerances by reducing the number of components requiring assembly.

The present invention provides such a magnet/block assembly for use in disc drive systems. The magnet/block assembly creates and distributes a permanent magnetic field which interacts with a transient magnetic field produced by an actuator coil in a disc drive system. The interaction between the two magnetic fields moves a track accessing arm and thereby positions and holds a transducer head assembly over various concentric tracks of a magnetic media disc. The magnet/block assembly includes permanent magnets and a block comprised of a back iron separated from a front iron by a gap space. A loop formed integrally with the back iron and the front iron connects the back iron to the front iron at an end of the gap space. Compared to magnet/block assemblies of the prior art, the magnet/block assembly of the present invention requires fewer individual elements to be assembled and minimizes the number of permanent magnets required by employing a single gap space.

BRIEF DESCRIPTION OF THE DRAWINGS

FIG. 3 is a perspective exploded view of a block of the magnet/block assembly of the present invention with an end loop removed.

FIG. 4 is a graph of a finite element analysis showing a distribution of a magnetic field within a magnet/block assembly of the prior art.

FIG. 5 is a graph of a finite element analysis showing a distribution of a magnetic field within the magnet/block assembly of the present invention.

FIG. 6 is a graph showing a relative comparison of the magnetic force constant that exists within the gap space of a magnet/block assembly of the prior art and the magnetic force constant that exists within the gap space of a magnet/block assembly of the present invention.

DETAILED DESCRIPTION OF THE PREFERRED EMBODIMENTS

Figure 1:
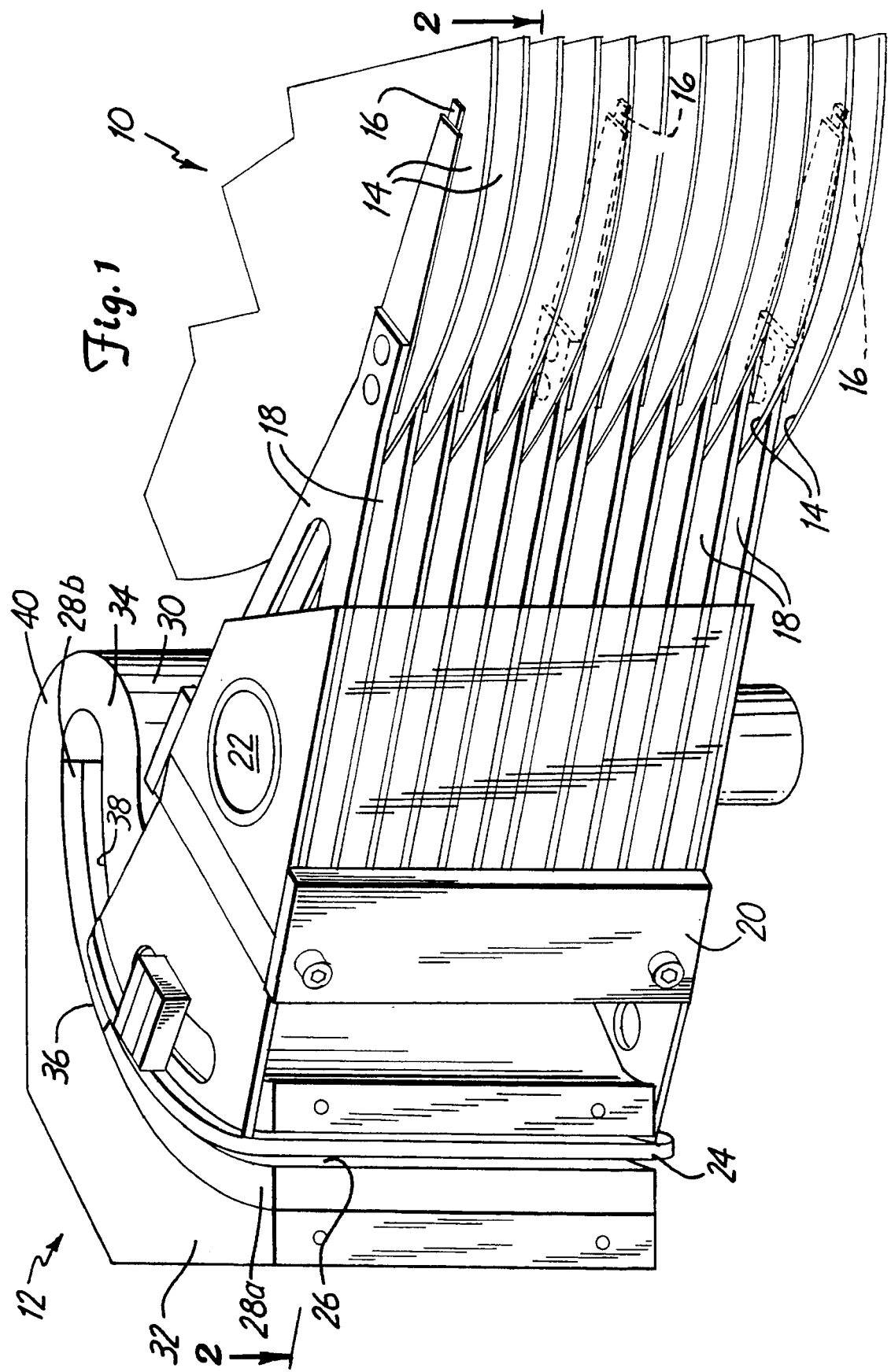
FIG. 1 is a perspective view of a disc drive system that employs the magnet/block assembly of the present invention.
Figure 2:
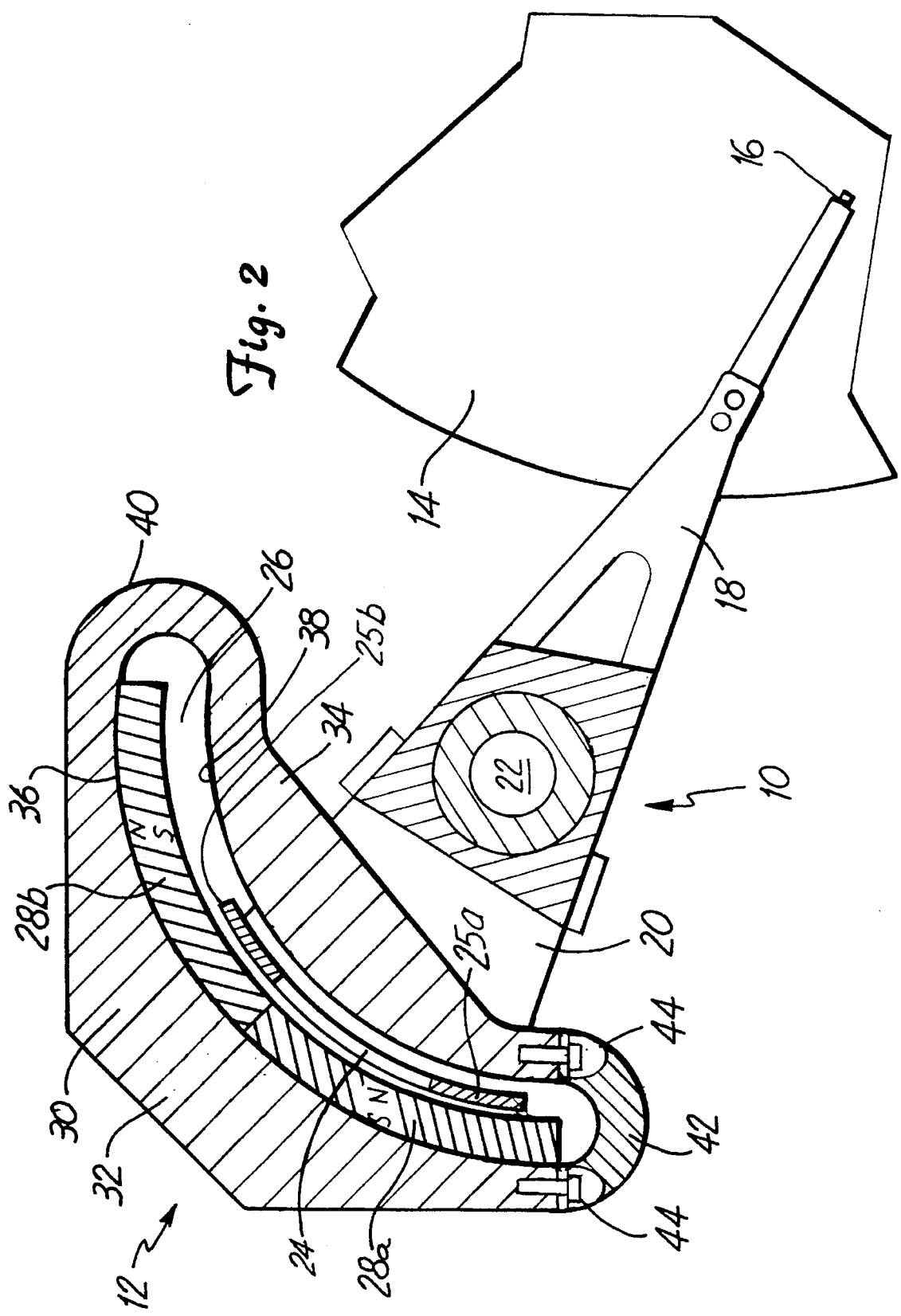
FIG. 2 is a sectional view taken along line 2—2 of FIG. 1 showing the magnet/block assembly of the present invention.

FIG. 1 shows part of a disc drive system 10 that employs an integrally formed magnet/block assembly 12 of the present invention. Disc drive system 10 includes a number of magnetic media discs 14 and a number of transducer head assemblies 16. Each transducer head assembly 16 is coupled to a track accessing arm 18. Track accessing arms 18 are assembled into a configuration known in the art as an "E" block. "E" block 20 is rotatably connected to spindle 22. Connected to an end of "E" block 20 opposite the end that carries transducer head assemblies 16 is actuator coil 24. Actuator coil 24 is positioned within gap space 26 of magnet/block assembly 12. As shown in FIG. 2, actuator coil 24 is a vertical flat voice coil, such as that disclosed in U.S. application Ser. No. 07/634,975 to Goss (now U.S. Pat. No. 5,050,026) and U.S. application Ser. No. 07/685,189 to Eliason (now U.S. Pat. No. 5,233,493). While coil 94 is a continuous winding, it is conveniently considered to include a pair of opposed vertical or longitudinal segments 25a and 25b (shown in FIG. 2).

Magnet/block assembly 12 is comprised of permanent magnets 28a and 28b and block 30. Block 30 is comprised of back iron 32 and front iron 34. The word "iron," which is used in reference to back iron 32 and front iron 34, is a term of the art and should not be interpreted as a limitation of the materials that may be used to form block 30. In the preferred embodiment, block 30 is formed of 10/10 steel. However, any material having desirable ferromagnetic properties may be used.

In block 30, back iron 32 has gap surface 36 and front iron 34 has gap surface 38. Gap space 26 separates gap surface 36 from gap surface 38. End loop 40 is formed integrally with back iron 32 and front iron 34 and connects the irons at one end of the gap space. End loop 40 provides a means for flux to be conducted between back iron 32 and front iron 34. In the preferred embodiment, magnets 28a and 28b are positioned within gap space 26 on gap surface 36 by adhesive means having visco-elastic properties. However, in alternative embodiments, permanent magnets may be placed anywhere in the gap space. Magnets 28a and 28b have opposite magnetic orientations in gap space 29 to create a permanent magnetic field that block 30 distributes throughout gap space 26.

Transducer head assemblies 16 read and write data to concentric tracks of a plurality of magnetic media discs 14. Transducer head assemblies 16 are moved between various concentric tracks of magnetic media discs 14 as "E" block 20 is rotated about an axis of rotation formed by spindle 22.

The vertical segments 25a and 25b (shown in FIG. 2) of coil 24 generate a magnetic field that interacts with the field of permanent magnets 28a and 28b to selectively rotated "E" block 20 about the axis of rotation.

FIG. 2 is a top sectional view of disc drive system 10 taken along line 2—2 of FIG. 1. Besides the elements shown in FIG. 1, FIG. 2 includes attached end loop 42 fastened to magnet/block assembly 12 by screws 44. Attached end loop 42 is attached to magnet/block assembly 12 after actuator coil 24 is placed within gap space 26. Attached end loop 42 serves a function similar to that of integrally formed end loop 40; it provides a path for flux to be conducted between back iron 32 and front iron 34.

In this embodiment, gap surfaces 36 and 38 have a shape substantially that of a curved surface of a quarter section of a right cylinder 1.560 inches tall. Gap surface 36 of back iron 32 has a radius of 1.750 inches. Gap surface 38 of front iron 34 has a radius of 1.389 inches as measured from a center point common to both gap surface 36 and gap surface 38. This forms a gap space 26 between the two gap surfaces of 0.352 inches, measured radially and exclusive of magnets 28a and 28b.

In alternative embodiments, the dimensions of block 30 can be altered to meet the requirements of particular disc drive systems. For example, gap surfaces 36 and 38 (shown in FIGS. 1 and 2) could have a larger or smaller arc to provide a corresponding larger or smaller range of movement for head transducer assemblies 16, as would be required for magnetic media discs of different radii. If gap surfaces 36 and 38 had larger or smaller radii, that would require coil 22 to be correspondingly farther from or closer to spindle 22. This would alter the angular leverage with which actuator coil 24 moves "E" block 20. Also, the height of block 30 can be varied to accommodate varying sizes of actuator coils.

FIG. 3 is an exploded perspective view of block 30 of the present invention showing end loop 42 and screws 44 removed and to the left of block 30.

In an alternative embodiment, attached end loop 42 could be replaced by a second integrally formed end loop similar to integrally formed end loop 40. This would distribute the magnetic field more evenly than the embodiment shown in FIG. 3. However, assembly and manufacturing requirements favor the invention as shown in FIGS. 2 and 3, with attached end loop 42, as the preferred embodiment.

FIG. 4 is a graph of a finite element analysis of a magnet/block assembly of the prior art having separately formed front and back irons. The ferromagnetic material in this magnetic/block assembly is saturated, which limits gap flux density. As shown in this figure, the distribution of the magnetic field is biased toward one end of the gap space.

In contrast, FIG. 5 is a graph of a finite element analysis of the magnetic field within gap space 26 of magnet/block assembly 12 of the present invention. The ferromagnetic material in magnet/block assembly 12 is not saturated because end loop 40 provides a path that limits saturation. The magnetic field is distributed much more symmetrically than is the magnetic field in the gap space of the magnet/block assembly of the prior art shown in FIG. 4. This produces a more linear interaction between actuator coil 24 of FIGS. 1 and 2 and the magnetic field in gap space 26.

FIG. 6 is a magnetic circuit comparison between a magnet/block assembly of the prior art, having separately formed front and back irons, and the magnet/block assembly of the present invention. In this graph, the abscissa represents an actuator position with reference to the magnet/block assembly of the present invention, with the left end of the abscissa representing the integral loop end of the gap space and the right end of the abscissa representing the attached loop end of the gap space. The ordinate of this graph represents a relative magnetic force constant. Line 46 shows the relationship between actuator coil position and relative magnetic force for magnet/block assembly 12 of the present invention. Line 48 shows the relationship between actuator coil position and relative magnetic force constant for a two piece magnet/block assembly of the prior art.

This graph indicates that for any given actuator coil position, the present invention provides a higher magnetic force constant than does a two piece magnet/block assembly of the prior art. A higher magnetic force constant allows a track accessing arm to respond more quickly while supplying the same amount of power to the actuator coil. Alternatively, a disc drive using the magnet/block assembly of the present invention can maintain the same level of track accessing arm performance as a disc drive using a prior art magnet/block assembly while supplying less power to the actuator coil, or can have more track accessing arms while supplying the same amount of current to the actuator coil.

Although the present invention has been described with reference to preferred embodiments, workers skilled in the art will recognize that changes may be made in form and detail without departing from the spirit and scope of the invention.

What is claimed is:

1. A disc drive system for writing data to and/or retrieving data from tracks of a media disc, the disc drive system comprising:

a transducer for recording and/or retrieving data;

a track accessing arm having a first end and a second end, with the second end coupled to the transducer;

an actuator spindle forming an axis of rotation intermediate the first end and the second end, the track accessing arm being pivotally mounted to the actuator spindle;

a back iron having a first gap surface;

a front iron having a second gap surface, the second gap surface being spaced from and facing the first gap surface to form a single arcuate magnetic gap space, the single magnetic gap space having a first end at a first arcuate location of the single magnetic gap space and a second end at a second arcuate location of the single magnetic gap space;

an actuator coil having a generally uniform thickness and a first segment and a second segment at different locations on the actuator coil, the actuator coil being coupled to the first end of the track accessing arm to position the first and second segments in the single magnetic gap space for arcuate travel therein to rotate the track accessing arm about the axis of rotation;

a first magnet for providing a first magnetic field passing through the first segment of the actuator coil;

a second magnet for providing a second magnetic field passing through the second segment of the actuator coil, the first and second magnetic fields being generally in opposite directions across the single magnetic gap space to form a first flux loop across the single magnetic gap space between the first and second ends;

first flux conduction means connected between the back iron and the front iron at the first end of the single magnetic gap space, for conducting flux between the back and front irons to form a second flux loop at the first end of the single magnetic gap space; and second flux conduction means connected between the back iron and the front iron at the second end of the single magnetic gap space, for conducting flux between the back and front irons to form a third flux loop at the second end of the single magnetic gap space, wherein the back iron, the front iron, and the first flux conduction means are formed from a single piece of material having ferromagnetic properties and the second flux conduction means is formed from a material having ferromagnetic properties.

2. The disc drive system of claim 1 wherein the first gap surface has a radius and a shape approximately that of a curved surface of a quarter section of a right cylinder.

3. The disc drive system of claim 1 wherein the first and second magnets each comprise:

at least one magnet positioned in the single magnetic gap space.

4. The disc drive system of claim 3 and further comprising:

adhesive means for attaching each magnet to at least one of the first and second gap surfaces.

5. The disc drive system of claim 4 wherein the adhesive means has visco-elastic properties.

6. The disc drive system of claim 1 wherein the second flux conduction means comprises an attached end loop.

7. The disc drive system of claim 1 wherein the back iron, the front iron, and the first and second flux conduction means are formed from 10/10 steel.

8. The disc drive system of claim 1 wherein the back iron, the front iron, and the first and second flux conduction means are formed from 10/10 steel.

9. A disc drive system comprising:

a track accessing arm having a first end;

an actuator spindle forming an axis of rotation, the track accessing arm being pivotally mounted to the actuator spindle;

a back iron having a first gap surface; a front iron having a second gap surface forming a single magnetic gap space between the first and second gap surfaces, the single magnetic gap space forming an arcuate path having a first end at a first arcuate location of the single magnetic gap space and a second end at a second arcuate location of the single magnetic gap space, the first gap surface being radially outside the arcuate path and the second gap surface being radially inside the arcuate path;

an arcuate actuator coil having a generally uniform radial thickness with respect to the axis of rotation, the actuator coil having a first segment and a second segment at different arcuate locations on the actuator coil, the actuator coil being coupled to the first end of the track accessing arm to position the first and second segments in the single magnetic gap space for arcuate travel therein to rotate the track accessing arm about the axis of rotation;

a first magnet for providing a first magnetic field passing through the first segment of the actuator coil;

a second magnet for providing a second magnetic field passing through the second segment of the actuator coil, the first and second magnetic fields being generally in opposite directions across the single magnetic gap surface to form a first flux loop across the single magnetic gap space between the first and second ends;

first flux conduction means at a first end of the single magnetic gap space, for conducting flux between the front iron and the back iron, wherein the back iron, the front iron and the first flux conduction means are formed from a single piece of material having ferromagnetic properties to form a second flux loop at the first end of the magnetic gap space; and second flux conduction means connected between the back iron and the front iron at a second end of the single magnetic gap space, for conducting flux between the back and front irons to form a third flux loop at the second end of the magnetic gap space, wherein the second flux conduction means is formed from material having ferromagnetic properties.

10. The disc drive system of claim 9 wherein the back iron, the front iron, and the first and second flux conduction means are formed of 10/10 steel.

11. A method of assembling a disc drive system comprising:

providing an actuator assembly having a transducer for recording and/or retrieving data, a track accessing arm with a first end and a second end, with the second end coupled to the transducer, the track accessing arm having an axis of rotation, and an arcuate actuator coil coupled to the first end of the track accessing arm, the actuator coil having a generally uniform radial thickness with respect to the axis of rotation, the actuator coil having a first segment and a second segment, the first and second segments being at different arcuate locations on the actuator coil;

pivotally mounting the track accessing arm to an actuator spindle of a magnet/block assembly, the magnet/block assembly including a back iron having a first gap surface, a front iron having a second gap surface, with the second gap surface being spaced from and facing the first gap surface to form a single arcuate magnetic gap space having a generally uniform radial thickness with respect to the axis of rotation between the first gap surface and the second gap surface, the single magnetic gap space having a first end at a first arcuate location of the single magnetic gap space and a second end at a second arcuate location of the single magnetic gap space, a first magnet for providing a first magnetic field passing through the first segment of the actuator coil, a second magnet for providing a second magnetic field passing through the second segment of the actuator coil, the first and second magnetic fields being generally in opposite directions across the single magnetic gap space to form a first flux loop across the single magnetic gap space between the first and second ends, and an integral end loop that connects the back iron and the front iron at a first end of the single magnetic gap space, wherein the back iron, the front iron, and the integral end loop are formed from a single piece of ferromagnetic material to form a second flux loop at the first end of the single magnetic gap space;

rotating the actuator assembly to position substantially all of the actuator coil within the single magnetic gap space; and attaching a second end loop to the front iron and back iron at a second end of the single magnetic gap space, the second end loop being formed of ferromagnetic material to form a third flux loop at the second end of the single magnetic gap space.

12. A disc drive system comprising:

a track accessing arm having a first end;

an actuator spindle forming an axis of rotation, the track accessing arm being pivotally mounted to the actuator spindle;

a back iron having a first gap surface;

a front iron having a second gap surface forming an arcuate path with the first gap surface being radially outside the arcuate path and the second gap surface being radially inside the arcuate path, thereby forming a single magnetic gap space between the first and second gap surfaces having first and second ends at respective ends of the arcuate path;

an arcuate actuator coil curved about the axis of rotation and coupled to the first end of the track accessing arm, the actuator coil being positioned within the single magnetic gap space for arcuate travel along the arcuate path and about the axis of rotation as the track accessing arm pivots, the actuator coil having at least first and second elongate, longitudinally extending coil active regions for pivoting the track accessing arm when conducting electric current, the first and second regions being spaced apart at different arcuate locations on the actuator coil;

a first magnet providing a first magnetic field passing through the first region of the actuator coil;

a second magnet providing a second magnetic field passing through the second region of the actuator coil, the first and second magnetic fields being generally in opposite directions radially across the single magnetic gap surface to form a first flux loop across the single magnetic gap space between the first and second ends;

first flux conduction means at a first end of the single magnetic gap space forming a second flux loop at the first end of the single magnetic gap space for conducting flux between the front iron and the back iron; and second flux conduction means at a second end of the single magnetic gap space forming a third flux loop at the second end of the single magnetic gap space for conducting flux between the back and front.

13. The disc drive system of claim 12 wherein the back iron, the front iron, and the first flux conduction means are formed from a single piece of material having ferromagnetic properties and wherein the second flux conduction means is formed from a separate piece of material having ferromagnetic properties and is connected to the front iron and the back iron.

14. A disc drive system comprising a track accessing arm having a first end;

an actuator spindle forming an axis of rotation, the track accessing arm being pivotally mounted to the actuator spindle;

an actuator coil curved about the axis of rotation and coupled to the first end of the track accessing arm for arcuate travel about the axis of rotation as the track accessing arm pivots, the actuator coil having at least first and second elongate, longitudinally extending coil active regions for pivoting the track accessing arm when conducting electric current, the first and second regions being spaced apart at different arcuate locations on the actuator coil;

a back iron having a first gap surface;

a front iron having a second gap surface forming an arcuate path with the first gap surface being radially outside the arcuate path and the second gap surface being radially inside the arcuate path, thereby forming a single magnetic gap space between the first and second gap surfaces, with the first and second regions of the actuator coil being substantially within the single magnetic gap space so that rotation of the actuator spindle about the axis of rotation causes the actuator coil to traverse the arcuate path;

first flux conduction means at a first end of the single magnetic gap space for conducting flux between the front iron and the back iron;

second flux conduction means at a second end of the single magnetic gap space for conducting flux between the back and front irons; and a first magnet providing a first magnetic field passing through the single magnetic gap space;

a second magnet providing a second magnetic field passing through the single magnetic gap space, the first and second magnetic fields providing a first flux loop through the first flux conduction means and across the single magnetic gap space adjacent the first flux conduction means, a second flux loop through the second flux conduction means and across the single magnetic gap space adjacent the second flux conduction means and a substantially symmetrical third flux loop across the single magnetic gap space between the first and second ends of the single magnetic gap space.

15. The disc drive system of claim 14 wherein the back iron, the front iron, and the first flux conduction means are formed from a single piece of material having ferromagnetic properties and wherein the second flux conduction means is formed from a separate piece of material having ferromagnetic properties and is connected to the front iron and the back iron.

* * * * *